Patented Oct. 6, 1942

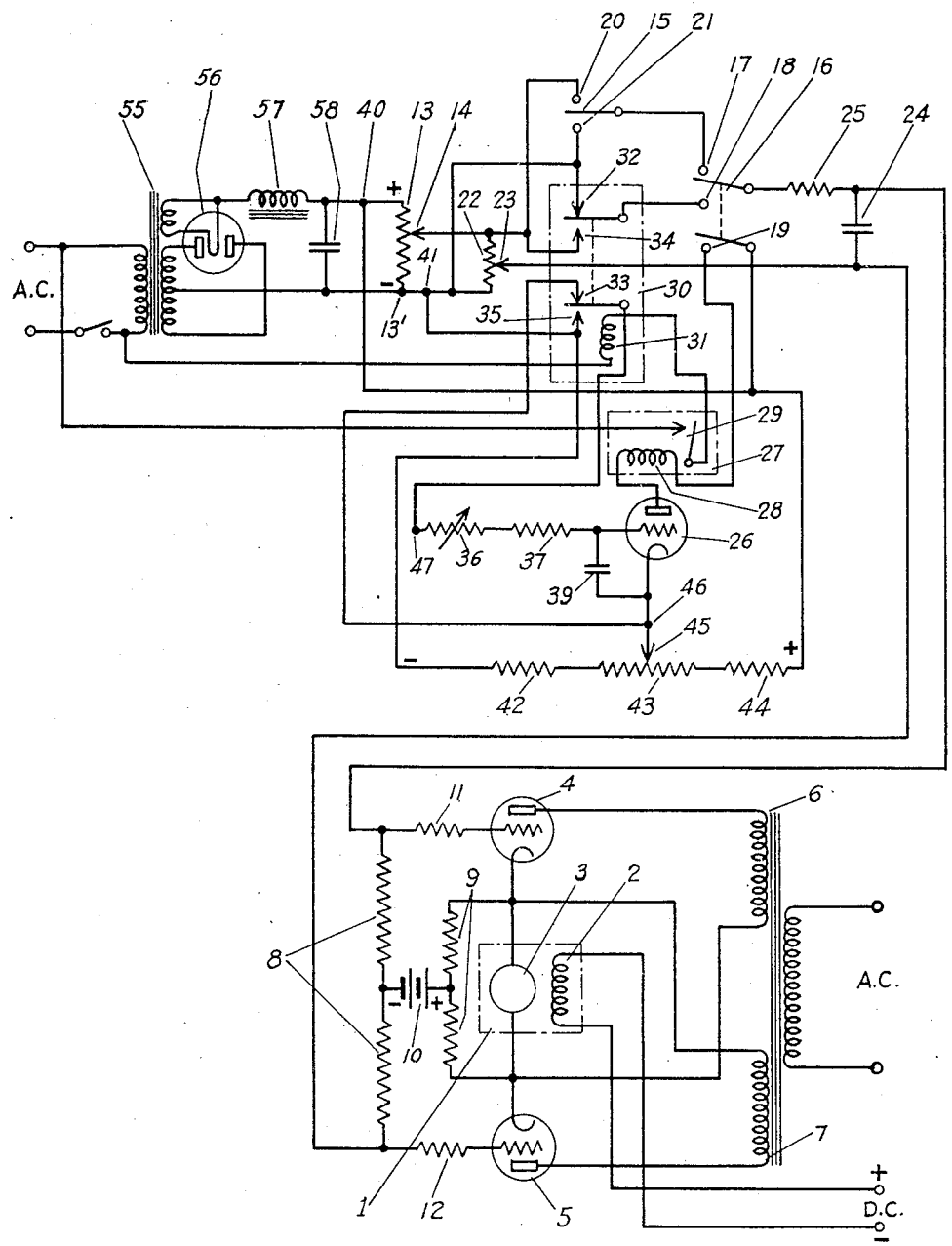

2,297,719

UNITED STATES PATENT OFFICE 2,297,719

CONTROL CIRCUIT

Howard A. Satterlee, Needham, Mass., assignor to Submarine Signal Company, Boston, Mass., a corporation of Maine Application December 22, 1938, Serial No. 247,203

9 Claims. (Cl. 172—240)

The present invention relates to control circuits particularly for the control of rotation of an object driven by a motor supplied with power from a device responsive to changes in polarity and magnitude of an applied potential.

It is an object of the present invention to provide such applied potentials under the complete control of an operator at a remote point whereby the driven object may be made to execute various desired motions at variable desired time intervals.

This and other objects of the present invention will best be understood by reference to the following description taken in connection with the accompanying drawing which shows a schematic diagram of the invention.

The object to be controlled is driven by the motor 1 having a field winding 2 continuously excited from a suitable direct current source and an armature 3. The armature 3 is supplied with current by either one of two grid controlled rectifiers of the gaseous discharge type 4 and 5. Anode potential for the rectifiers is supplied by an alternating current energized transformer having two secondary windings 6 and 7 connected in series with the armature 3 as shown so that the current from one rectifier will pass through the armature in the reverse direction from the current from the second rectifier.

The rectifiers are of such a type that if the grids have a positive potential greater than a certain minimum, the tube will pass current during the positive half cycles of anode potential, while if the grid potential is below this minimum value, no current will flow. The grids of the rectifiers are controlled by a potential impressed across the center-tapped resistor 8. The polarity of the potential applied across this resistor, therefore, determines which of the rectifiers shall pass current and consequently determines the direction of rotation of the armature 3. A second center-tapped resistor 9 has its extremities connected to the cathodes of the two rectifiers, respectively, and its center point through a biasing battery 10 to the center point of the resistor 8. By this arrangement the back electromotive force generated by the rotation of the armature 3 in the magnetic field produced by the winding 2 is impressed across the resistor 9. The grid circuits of the two tubes also contain current-limiting resistors 11 and 12, respectively. The effective grid-cathode potential acting upon the tube 4, therefore, consists of the algebraic sum of the potential drop in the upper half of the resistor 8, the potential of the biasing battery 10 and the potential drop in the upper half of resistor 9. Likewise the grid-cathode potential of the tube 5 consists of the algebraic sum of the potential drop along the lower half of resistor 8, the potential of the battery 10 and the potential drop of the lower half of resistor 9.

In view of this arrangement only one rectifier can be energized at a time and the motor speed will vary substantially linearly with variations in the magnitude of the potential applied across resistor 8. This circuit is more fully described and is claimed in my United States Patent No. 2,147,674, issued February 21, 1939.

The remainder of the circuit diagram shown in the drawing is for the purpose of supplying potentials of suitable magnitude and polarity to cause the motor 3 automatically or under manual control to execute various desired motions. A direct potential is continuously applied across a potentiometer 13 having a movable contact 14. This potential may be obtained from any suitable source but as shown in the drawing is obtained from a rectifier circuit energized by an alternating current source.

The rectifier circuit includes a transformer 55 supplying a full wave rectifier 56 whose output potential is filtered by means of a choke 57 and condenser 58 and then is impressed across a potentiometer 13. The potentiometer potential or a portion thereof may be impressed on the resistor 8 either through manually operated switches or through relays operated by a timing circuit which periodically reverses the polarity. In both cases I prefer to divide further the potential drop along the resistor 13 between the movable contact 14 and the terminal 13' into two more or less equal parts by the potentiometer 22 having a movable contact 23. One terminal of resistor 8 is directly connected by the lead 50 to the movable contact 23 while the other end of resistor 8 is connected by a manual or relay operated switch to either of the extremities of potentiometer 22. The resistor 8 may, therefore, have impressed across it the potential drop either across the upper or lower half of the potentiometer 22 and this determines the polarity of the potential applied across the resistor 8 and the direction of motor rotation.

For direct manual control a manually operated, single-pole, double-throw switch 15 is provided which is closed to either of its contacts 20 or 21; there is also provided a manually operated double-pole double-throw switch 16 which when closed in its upper position, has the upper switch blade in contact with stud 17, the lower switch blade being open circuited.

The switch 15, when the switch 16 is thrown to its upper position, serves to reverse the polarity of the potential applied across resistor 8, and thereby to determine which of the rectifiers 4 or 5 shall be energized and hence in which direction the motor shall run. Thus, when the switch blade 15 makes contact with the stud 20, the motor will operate in one direction whereas when the switch blade 15 makes contact with the stud 21, the motor will operate in the reverse direction. The function of switch 16 is to shift from manual to automatic operation as will appear hereinafter.

If the movable contact 23 be set in its central position, the motor will run at equal speed in both directions, since the grids of both rectifiers 4 and 5 will have the same positive bias potential, but if the movable contact 23 be placed in other than central position, the motor will run faster in one direction than in the other, since the potential impressed on resistor 8 will be smaller for one position of switch 15 than for the other position. The basic motor speed can be controlled by varying the position of the contact 14 on the potentiometer 13.

In order to make the motor start and stop gradually, there are inserted in the potential supply leads to the resistor 8 a parallelly connected condenser 24 and a series resistance 25 which have such values that the combination has a definite time constant. Abrupt increase or decrease of the potential across resistor 8 is thereby prevented.

Instead of manually controlling the reversal of the motor 3, this may be done automatically and at any selected periodic cycle by throwing the switch 16 into its lower position where the switch blades make contact with the studs 18 and 19. The polarity of the potential applied across resistor 8 then varies automatically in accordance with a timing circuit now to be described.

The timing circuit includes a vacuum tube 26 whose anode current controls the operation of a relay 27 whose operating coil 28 is directly connected in series in the tube's anode circuit. The relay is provided with a single pair of contacts 29 which are spring-biased to open position, but which close upon energization of coil 28. When contacts 29 are closed, current from a suitable source is supplied to coil 31 of a double-pole, double-throw relay 30 which is biased in one position, for example, with the movable contacts engaging the upper set of stationary contacts 32, 33 as shown in the drawing. When the relay coil 31 is energized, the movable contacts connect with the lower set of stationary contacts 34, 35. Contacts 32 and 34 determine the polarity of the potential applied across resistor 8 while contacts 33 and 35 control the further operation of the timing circuit.

The tube 26 contains in its grid-cathode circuit a variable resistor 36 in series with a fixed resistor 37 and a shunt condenser 39. Both anode and grid potentials for the tube 26 are obtained from the output of the rectifier tube 16 at the terminals 40 and 41 by way of relay contacts 33 or 35. This potential is impressed across the three serially connected resistors 42, 43 and 44. The cathode of the tube 26 is connected by means of an adjustable contact 45 to the resistor 43 as shown. Thus, when the relay 27 is energized by current flowing through tube 26 and the contacts 29 are closed, the relay 30 will also be energized so that its movable contacts will be in the lower position. The potential drop across resistance 42 and the left portion of resistance 43 is then impressed between the cathode of tube 26 and the terminal 47 of resistance 36, whereby the condenser 39 becomes charged. The polarity is such that the grid side of the condenser becomes negative and the cathode side, positive. When the charge on condenser 39 reaches a predetermined value, the grid of tube 26 becomes sufficiently negative to reduce the current flowing through the tube 26 sufficiently to release the armature of relay 27, thereby permitting contacts 29 to open. Winding 31 of relay 30 consequently is deenergized permitting the movable contacts of relay 30 to return to the upper position as shown in the drawing. The lower movable contact of relay 30 is now connected with contact 33 which effects a short circuit between terminal 46 and terminal 47, thereby permitting the condenser 39 to discharge through resistors 36 and 37. When the condenser 39 has discharged to a certain value, the potential of the grid of tube 26 again approaches that of the cathode sufficiently to permit plate current to build up in the tube and again to energize relay 27, thereby repeating the operation previously described.

It will be noted that while condenser 39 is charging, the upper movable contact of relay 30 is connected to the stud 34, whereby the potential existing across the upper half of potentiometer 22 is applied across resistance 8 whereas while condenser 39 is discharging, the upper movable contact of relay 30 is connected to the stud 32 whereby the potential drop across the lower half of potentiometer 22 is applied across resistance 8 and the polarity has been reversed. The direction of motor rotation has consequently also been reversed.

It will be understood that the rate at which the reversals of motor operation take place is dependent upon the time constant of the condenser-resistance combination in the grid circuit of tube 26. The resistance 36 is made variable preferably through a fairly large range whereby the time constant in the grid circuit of tube 26 may be varied and consequently the rate of reversal of polarity of the potential applied to resistance 8 may likewise be made to take place at varying periods of time. Since the current required to close relay 27 will be different from the current at which the relay opens and since the condenser charging voltage will be different from the discharging voltage, the connection of the cathode of tube 26 to resistance 43 is made adjustable so that proper compensation can be made to effect the opening and closing of relay 27 at the desired times. The adjustment is preferably made so that the relay will open and close at equal time intervals.

It will be observed that the system I have described has the following possibilities: With the switch 16 in its upper position the rotation of the motor and of any object connected to it can be controlled by the operator to take place in any desired direction by means of the switch 15. The speed of rotation can be controlled by adjustment of the potentiometer contact 14. Moreover by adjustment of contact 23 the relative speed of operation in one direction with respect to that in the other direction can be controlled.

On the other hand, if the switch 16 be thrown to its lower position, the motor will automatically reverse its direction of rotation at substantially equal time intervals. The rate of reversal can be adjusted by varying the resistance 36. The motor speed in both directions of rotation can be adjusted by varying the position of contact 14. The speed of rotation in one direction with respect to that in the other direction can be varied by changing the adjustment of contact 23. Thus, if the object to be driven by the motor is connected to it by suitable gearing, the object can be made to rotate at any desired speed through any desired angle first in one direction and then in the other. If the motor speed in one direction be made greater than that in the other direction by adjustment of contact 23, the driven object will move through a greater angle in one direction than in the reverse direction.

This control of the motion of the driven object can readily be accomplished at a point remote from both the motor and the object. While I have mentioned controlling the rotation of an object, it will be obvious that instead of being caused to rotate, the object, by suitable gearing or other mechanical structure, may be made to traverse any desired path.

Having now described by invention, I claim:

1. In a system for the control of rotation of an object driven by a motor supplied with power from a device responsive to a change in polarity and magnitude of an applied potential for changing the direction of rotation and speed respectively of said motor, means for controling said applied potential including a potential source, and means for cyclically reversing the polarity of the potential from said source including reversing relay means and a time-measuring circuit for controlling the operation of the relay means.

2. In a system for the control of rotation of an object driven by a motor supplied with power from a device responsive to a change in polarity and magnitude of an applied potential for changing the direction of rotation and speed respectively of said motor, means for controlling said applied potential including a potential source, and means for cyclically reversing the polarity of the potential from said source including reversing relay means operable in response to a definite current flow, vacuum tube means capable of producing said current flow through said relay in response to a definite grid potential and a condenser-resistance charge and discharge circuit operatively connected to said grid through a contact element of said relay means.

3. In a system for the control of rotation of an object driven by a motor supplied with power from a device responsive to a change in polarity and magnitude of an applied potential for changing the direction of rotation and speed respectively of said motor, means for controlling said applied potential including a potential source, and means for cyclically reversing the polarity of the potential from said source including reversing relay means operable in response to a definite current flow, vacuum tube means capable of producing said current flow through said relay in response to a definite grid potential and a condenser-resistance charge and discharge circuit operatively connected to said grid through a contact element of said relay means, and means for varying the time constant of said condenser-resistance circuit, whereby the rate of reversals of rotation of said object can be varied.

4. In a system for the control of rotation of an object driven by a motor supplied with power from a device responsive to a change in polarity and magnitude of an applied potential for changing the direction of rotation and speed respectively of said motor, means for controlling said applied potential including a potential source, means for cyclically reversing the polarity of the potential from said source, and means for retarding the growth and decay of said potential at each reversal of polarity whereby the motor will start and stop slowly.

5. In a system for the control of rotation of an object driven by a motor supplied with power from a device responsive to a change in polarity and magnitude of an applied potential for changing the direction of rotation and speed respectively of said motor, means for controlling said applied potential including a potential source, means for cyclically reversing the polarity of the potential from said source, and means for retarding the growth and decay of said potential at each reversal of polarity comprising a condenser and resistance circuit having a suitable time constant interposed between said device and said polarity reversing means.

6. In a system for the control of rotation of an object driven by a motor supplied with power from a device responsive to a change in polarity and magniaude of an applied potential for changing the direction of rotation and speed respectively of said motor, means for controlling said applied potential including a potential source, means independent of the controlled object for cyclically reversing the polarity of the potential from said source and maintaining the period of cyclical reversals substantially equal in time and means for varying the ratio of the magnitude of potential applied to said device in one polarity to the magnitude of the potential in the reverse polarity.

7. In a system for the control of rotation of an object driven by a motor supplied with power from a pair of grid-controlled rectifiers, one rectifier driving the motor in one direction and the other rectifier driving the motor in the opposite direction, the grids of said rectifiers being respectively connected to opposite ends of a potentiometer, means for applying controlling potentials across said potentiometer including a potential source, means for varying the magnitude of the potential from said source, means for cyclically reversing the polarity of the potential from said source, means for varying the rate of said cyclical polarity reversals, means for varying the ratio of the potential in one polarity to that in the reverse polarity and means for retarding the growth and decay of the potential at each reversal of polarity.

8. In a system for the control of rotation of an object driven by a motor supplied with power from a device responsive to a change in polarity and magnitude of an applied potential for changing the direction of rotation and speed respectively of said motor, means for controlling said applied potential including means providing two potentials of opposite polarity, means for carying the ratio of the magnitudes of said potentials to produce predetermined motor speeds in each of said directions and means for alternately at substantially equal time intervals impressing on said device first one of said potentials and then the other thereof.

9. A system for operating a motor including in combination with said motor a direct current power source means for applying the power source alternately in reversed directions with a greater potential in one direction than in other directions to said motor for driving the motor in reversed directions, and a time control circuit operative to control the period of reversals and maintain the period of cyclical reversals substantially equal in time.

HOWARD A. SATTERLEE.